(12) United States Patent
Ishii et al.

(10) Patent No.: US 10,059,284 B2
(45) Date of Patent: Aug. 28, 2018

(54) VEHICLE-MOUNTED DEVICE CONTROL SYSTEM

(75) Inventors: Eiichi Ishii, Nissin (JP); Kazuyoshi Obayashi, Chita-gun (JP); Masatoshi Takahara, Okazaki (JP); Takashi Hayashi, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1150 days.

(21) Appl. No.: 12/448,780

(22) PCT Filed: Jun. 30, 2008

(86) PCT No.: PCT/JP2008/062247
§ 371 (c)(1),
(2), (4) Date: Jul. 7, 2009

(87) PCT Pub. No.: WO2009/013994
PCT Pub. Date: Jan. 29, 2009

(65) Prior Publication Data
US 2010/0057306 A1   Mar. 4, 2010

(30) Foreign Application Priority Data

Jul. 24, 2007   (JP) .................................. 2007-192090

(51) Int. Cl.
*B60R 16/023* (2006.01)
*B60L 3/00* (2006.01)
(Continued)

(52) U.S. Cl.
CPC ........ *B60R 16/0231* (2013.01); *B60L 3/0084* (2013.01); *B60L 3/12* (2013.01);
(Continued)

(58) Field of Classification Search
CPC .. B60K 6/48; B60K 6/54; B60L 11/14; B60L 11/1862; B60L 15/2045; B60L 2240/60;
(Continued)

(56) References Cited

U.S. PATENT DOCUMENTS 5,467,277 A * 11/1995 Fujisawa et al. ............... 701/51
5,697,048 A * 12/1997 Kimura ........................... 725/75
(Continued)

FOREIGN PATENT DOCUMENTS

JP   A-09-051589   2/1997
JP   A-2001-145174   5/2001
(Continued)

OTHER PUBLICATIONS

Nov. 8, 2011 Office Action issued in Japanese Patent Application No. 2007-192090 (with translation).
(Continued)

*Primary Examiner* — Thomas G Black
*Assistant Examiner* — Sze-Hon Kong
(74) *Attorney, Agent, or Firm* — Oliff PLC (57) ABSTRACT

A vehicle-mounted device control system includes a first vehicle-mounted device, a second vehicle-mounted device, and a control unit connected to the first vehicle-mounted device and the second vehicle-mounted device. The control unit includes signal transmission means that transmits a predetermined signal to the first vehicle-mounted device, cooperative control means that performs cooperative control in which the second vehicle-mounted device is controlled using information used by the first vehicle-mounted device when the first vehicle-mounted device responds to the predetermined signal, and alternative control means that performs alternative control in which the second vehicle-mounted device is controlled without using information, used by the first vehicle-mounted device, when the first (Continued)

vehicle-mounted device does not respond to the predetermined signal.

8 Claims, 6 Drawing Sheets

(51) Int. Cl.
| | | |
|---|---|---|
| *B60L 3/12* | (2006.01) | |
| *B60L 11/12* | (2006.01) | |
| *B60L 11/14* | (2006.01) | |
| *B60L 11/18* | (2006.01) | |

(52) U.S. Cl.
CPC ............ *B60L 11/123* (2013.01); *B60L 11/14* (2013.01); *B60L 11/1846* (2013.01); *B60L 2240/72* (2013.01); *B60L 2240/80* (2013.01); *B60L 2250/16* (2013.01); *Y02T 10/6217* (2013.01); *Y02T 10/7005* (2013.01); *Y02T 10/7072* (2013.01); *Y02T 10/7077* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ........ B60L 3/0084; B60L 3/12; B60L 11/123; B60L 11/1846; B60W 10/06; B60W 10/08; B60W 20/00; B60W 2550/402; G01C 21/3461; G01C 21/3469; F01N 3/031; F01N 9/002; F01N 3/021; F01N 13/04; F16H 59/66; F16H 61/0213; B60R 16/0231
USPC ...... 701/36, 48, 32.4, 32.8, 34.4, 29.1, 29.2, 701/472, 473, 476, 483, 490
See application file for complete search history.

(56) References Cited

U.S. PATENT DOCUMENTS

| | | | |
|---|---|---|---|
| 5,815,824 A * | 9/1998 | Saga et al. ...................... 701/22 |
| 5,832,396 A * | 11/1998 | Moroto ................. B60K 6/485 701/22 |
| 5,835,873 A * | 11/1998 | Darby et al. ..................... 701/45 |
| 5,841,983 A * | 11/1998 | Takaba et al. ................ 709/225 |
| 5,890,080 A * | 3/1999 | Coverdill et al. ........... 701/31.4 |
| 5,957,985 A * | 9/1999 | Wong et al. ................. 701/29.2 |
| 6,122,572 A * | 9/2000 | Yavnai ............................. 701/23 |
| 6,226,572 B1 * | 5/2001 | Tojima et al. .................... 701/23 |
| 6,314,352 B1 * | 11/2001 | Kunimatsu et al. ............ 701/36 |
| 6,337,622 B1 * | 1/2002 | Sugano .......................... 340/438 |
| 6,463,373 B2 * | 10/2002 | Suganuma et al. ............. 701/48 |
| 6,507,127 B1 * | 1/2003 | Amano ................... B60K 1/02 290/40 A |
| 6,516,261 B2 * | 2/2003 | Ohashi et al. .................. 701/51 |
| 6,574,734 B1 * | 6/2003 | Colson et al. ................. 726/21 |
| 6,697,717 B2 * | 2/2004 | Shioda et al. .................. 701/22 |
| 6,801,855 B1 * | 10/2004 | Walters et al. ............... 701/410 |
| 6,871,299 B2 * | 3/2005 | Havekost et al. ........... 714/47.2 |
| 6,983,306 B1 | 1/2006 | Sameshima et al. |
| 7,117,397 B1 * | 10/2006 | Kondo et al. .................. 714/48 |
| 7,206,524 B2 * | 4/2007 | Yokoe ............................. 399/12 |
| 7,233,783 B2 * | 6/2007 | Usui .......................... 455/404.2 |
| 7,263,298 B2 * | 8/2007 | Nagamine et al. ............. 399/12 |
| 7,319,924 B2 * | 1/2008 | Ampunan et al. ................ 701/1 |
| 7,321,295 B2 | 1/2008 | Kaneko et al. |
| 7,328,104 B2 * | 2/2008 | Overstreet et al. ........... 701/472 |
| 7,402,920 B2 | 7/2008 | Kamiya |
| 7,406,037 B2 * | 7/2008 | Okita ............................. 370/218 |
| 7,409,290 B2 * | 8/2008 | Lin ............................... 701/470 |
| 7,428,663 B2 * | 9/2008 | Morton et al. .................. 714/36 |
| 7,446,425 B2 | 11/2008 | Sato |
| 7,471,999 B2 * | 12/2008 | Taki ............................. 701/32.7 |
| 7,474,947 B2 * | 1/2009 | Furui et al. ...................... 701/36 |
| 7,515,933 B2 * | 4/2009 | Oesterling et al. ........ 455/553.1 |
| 7,530,345 B1 * | 5/2009 | Plante et al. .................. 123/361 |
| 7,616,104 B2 * | 11/2009 | Hara et al. ..................... 340/438 |
| 7,630,807 B2 * | 12/2009 | Yoshimura et al. ............ 701/48 |
| 7,650,217 B2 * | 1/2010 | Ueyama ......................... 701/96 |
| 7,694,312 B2 * | 4/2010 | Rivard et al. ................. 719/321 |
| 7,729,827 B2 * | 6/2010 | Sakurai et al. .............. 701/31.7 |
| 7,739,013 B2 * | 6/2010 | Ishio et al. ..................... 701/48 |
| 7,747,961 B2 * | 6/2010 | Watanabe et al. ............. 715/773 |
| 7,791,217 B2 * | 9/2010 | Kamaga ........................ 307/9.1 |
| 7,856,299 B2 * | 12/2010 | Fink et al. .................... 701/31.4 |
| 7,860,621 B2 * | 12/2010 | Decke et al. ................... 701/36 |
| 7,925,426 B2 * | 4/2011 | Koebler .................... B60L 3/12 180/65.26 |
| 7,979,203 B2 * | 7/2011 | Haag et al. .................... 701/412 |
| 7,987,667 B2 * | 8/2011 | Meier et al. .................... 60/324 |
| 8,103,414 B2 * | 1/2012 | Boss et al. ...................... 701/48 |
| 8,131,838 B2 * | 3/2012 | Bornhoevd et al. .......... 709/224 |
| 8,165,743 B2 * | 4/2012 | Oyama ......................... 701/29.2 |
| RE43,619 E * | 8/2012 | Newberry ....................... 700/86 |
| 8,260,483 B2 * | 9/2012 | Barfoot et al. ................. 701/23 |
| 8,725,380 B2 * | 5/2014 | Braunberger et al. .......... 701/70 |
| 2001/0041956 A1 * | 11/2001 | Wong et al. ..................... 701/36 |
| 2001/0049573 A1 * | 12/2001 | Ohashi et al. .................. 701/51 |
| 2002/0021245 A1 * | 2/2002 | Lin et al. .................. 342/357.14 |
| 2002/0066112 A1 * | 5/2002 | Yearwood ..................... 725/141 |
| 2002/0085043 A1 * | 7/2002 | Ribak ............................ 345/810 |
| 2003/0004616 A1 * | 1/2003 | Obradovich et al. ............. 701/1 |
| 2003/0009271 A1 * | 1/2003 | Akiyama ........................ 701/33 |
| 2003/0125875 A1 * | 7/2003 | Lee ............................... 701/221 |
| 2004/0230687 A1 * | 11/2004 | Nakamura et al. ........... 709/228 |
| 2004/0236885 A1 * | 11/2004 | Fredriksson et al. ......... 710/100 |
| 2004/0254690 A1 | 12/2004 | Hasegawa et al. |
| 2005/0038573 A1 * | 2/2005 | Goudy ............................. 701/1 |
| 2005/0149242 A1 * | 7/2005 | Pavlish ........................... 701/45 |
| 2005/0188384 A1 * | 8/2005 | Yogaratnam et al. ........ 719/331 |
| 2005/0192726 A1 * | 9/2005 | Okura et al. .................... 701/36 |
| 2005/0281414 A1 * | 12/2005 | Simon et al. .................... 381/86 |
| 2006/0004517 A1 | 1/2006 | Hasegawa et al. |
| 2006/0053274 A1 * | 3/2006 | Nyuugaku et al. ................ 713/1 |
| 2006/0278449 A1 * | 12/2006 | Torre-Bueno ............ B60K 6/46 180/65.29 |
| 2007/0005204 A1 * | 1/2007 | Yamamoto et al. ............ 701/35 |
| 2007/0032917 A1 * | 2/2007 | Behr ................................. 701/1 |
| 2007/0112475 A1 * | 5/2007 | Koebler .................... B60L 3/12 701/1 |
| 2007/0226795 A1 * | 9/2007 | Conti et al. .................... 726/22 |
| 2008/0006236 A1 * | 1/2008 | Yamashita et al. ........ 123/198 R |
| 2008/0027602 A1 * | 1/2008 | Yeap et al. ..................... 701/29 |
| 2008/0119987 A1 * | 5/2008 | Hestermeyer et al. ......... 701/41 |
| 2008/0221752 A1 * | 9/2008 | Jager et al. ..................... 701/35 |
| 2009/0322597 A1 * | 12/2009 | Medina Herrero et al. ................. 342/357.02 |
| 2012/0192173 A1 * | 7/2012 | Price ............................. 717/172 |
| 2012/0244879 A1 * | 9/2012 | Freathy et al. ............. 455/456.1 |

FOREIGN PATENT DOCUMENTS

| | | |
|---|---|---|
| JP | A-2004-309418 | 11/2004 |
| JP | A-2005-168193 | 6/2005 |
| JP | A-2006-093964 | 4/2006 |
| JP | A-2006-113892 | 4/2006 |
| JP | A-2007-008387 | 1/2007 |
| JP | A-2007-141145 | 6/2007 |

OTHER PUBLICATIONS

Feb. 9, 2010 Notification of Transmittal of Translation of the International Preliminary Report on Patentability issued in International Application No. PCT/JP2008/062247.

Aug. 12, 2008 Written Opinion issued in International Application No. PCT/JP2008/062247.

(56) References Cited

OTHER PUBLICATIONS

Japanese Office Action issued in Japanese Patent Application No. 2007-192090 dated Apr. 24, 2012 (with translation).

* cited by examiner

VEHICLE-MOUNTED DEVICE CONTROL SYSTEM

TECHNICAL FIELD

The present invention relates to a vehicle-mounted device control system, and more particularly to a vehicle-mounted device control system that is advantageously applicable to configurations in which information used by one vehicle-mounted device is used for controlling another vehicle-mounted device.

BACKGROUND ART

Japanese Patent Laid-Open Publication No. 2006-113892 (Patent Document 1) describes an electric vehicle automatic operation management system that enables an electric vehicle with depleted battery power to reliably reach a place where the battery can be charged. This system comprises an electric vehicle, an electric vehicle management device, (hereinafter referred to as a management device), and a wind power charging station (hereinafter referred to as a charging station), and operates as follows.

The management device analyzes data sent from the electric vehicle and, if the battery capacity is low, sends a forced automatic driving instruction command to the electric vehicle. In addition, the management device analyzes the data on the registered charging stations and sends the charging reservation signal to a charging station. If the reservation is acceptable, the charging station accepts the reservation and reserves the amount of electricity necessary for charging. The management device provides the electric vehicle with information on the reserved charging station. The car navigation system in the electric vehicle uses the acquired station information to guide the electric vehicle to the reserved charging station.

DISCLOSURE OF THE INVENTION

Problems Solved by the Invention

An electric vehicle automatic operation management system as described above requires that the electric vehicle, the management device, and the charging station all conform to the specifications of the system. This means that, when the communication unit of the electric vehicle is replaced by a unit that does not satisfy the specifications of the system, the management device and the car navigation system cannot use the electric-vehicle battery capacity information and the system will cause a control failure. Such a control failure may occur in a general vehicle-mounted control system in which information, used by one vehicle-mounted device, is used for controlling another vehicle-mounted device.

It is an object of the present invention to provide a vehicle-mounted device control system in which cooperative control is carried out using information, used by one vehicle-mounted device, for controlling another vehicle-mounted device in order to carry out cooperative control properly for preventing a control failure.

Means to Solve the Problems

A vehicle-mounted device control system according to the present invention comprises a first vehicle-mounted device; a second vehicle-mounted device; and a control unit connected to the first vehicle-mounted device and the second vehicle-mounted device wherein the control unit comprises signal transmission means that transmits a predetermined signal to the first vehicle-mounted device; cooperative control means that performs cooperative control in which, when the first vehicle-mounted device responds to the predetermined signal, the second vehicle-mounted device is controlled using information used by the first vehicle-mounted device; and alternative control means that performs alternative control in which, when the first vehicle-mounted device does not respond to the predetermined signal, the second vehicle-mounted device is controlled without using information used by the first vehicle-mounted device.

Preferably, the control unit further comprises inquiry means that sends an inquiry to an operator via an output unit connected to the control unit when the first vehicle-mounted device does not respond to the predetermined signal, the inquiry asking if the first vehicle-mounted device is a specification conforming device satisfying specifications predetermined for the cooperative control.

Preferably, the control unit further comprises notification means that accepts a response to the inquiry from the operator via an input unit connected to the control unit and, if the response indicates that the first vehicle-mounted device is an alternative device at least a part of which does not satisfy the specifications, outputs a notification, which indicates that the cooperative control will not be carried out, via the output unit.

Preferably, the control unit further comprises type recording means that records a type record in a storage unit connected to the control unit when the first vehicle-mounted device is an alternative device, the type record indicating that the first vehicle-mounted device is an alternative device; and type record deletion means that deletes the type record.

Preferably, the control unit further comprises inquiry omission means that omits the inquiry if the type record is detected in the storage unit before the inquiry is issued, the type record indicating that the first vehicle-mounted device is an alternative device.

Preferably, the control unit further comprises notification stop means that accepts a command, which stops the notification, from the operator via the input unit and stops the notification.

Preferably, the control unit further comprises notification stop release means that accepts a command, which releases the notification stop, from the operator from the input unit and releases the notification stop.

Preferably, an input unit and an output unit of a terminal device connected to the control unit are used as the input unit and the output unit.

Effects of the Invention

With a configuration as above, cooperative control is performed when an information providing vehicle-mounted device responds to the predetermined signal, while an alternative control other than cooperative control is performed when the information providing vehicle-mounted device does not respond. As such, cooperative control is not performed when the information providing vehicle-mounted device is an alternative device or when a failure is generated in the path to the communication system of the information providing vehicle-mounted device. As a result, this configuration provides a vehicle-mounted device control system which performs cooperative control appropriately and which prevents a control failure.

DESCRIPTION OF NUMERALS

1 Vehicle-mounted device control system, 10 First vehicle-mounted device, 20, 20-1, 20-2, 20-3 Second vehicle-mounted device, 74 Output unit, 78 Input unit, 82 Storage unit, 100 Control unit, 104 Signal transmission means, 108 Cooperative control means, 112 Alternative control means, 116 Inquiry means, 120 inquiry omission means, 124 Notification means, 128 Notification stop means, 132 Notification stop release means, 136 Type recording means, 140 Type record deletion means

BEST MODE FOR CARRYING OUT THE INVENTION

An embodiment of the present invention will be described in detail below with reference to the drawings.

Figure 1:
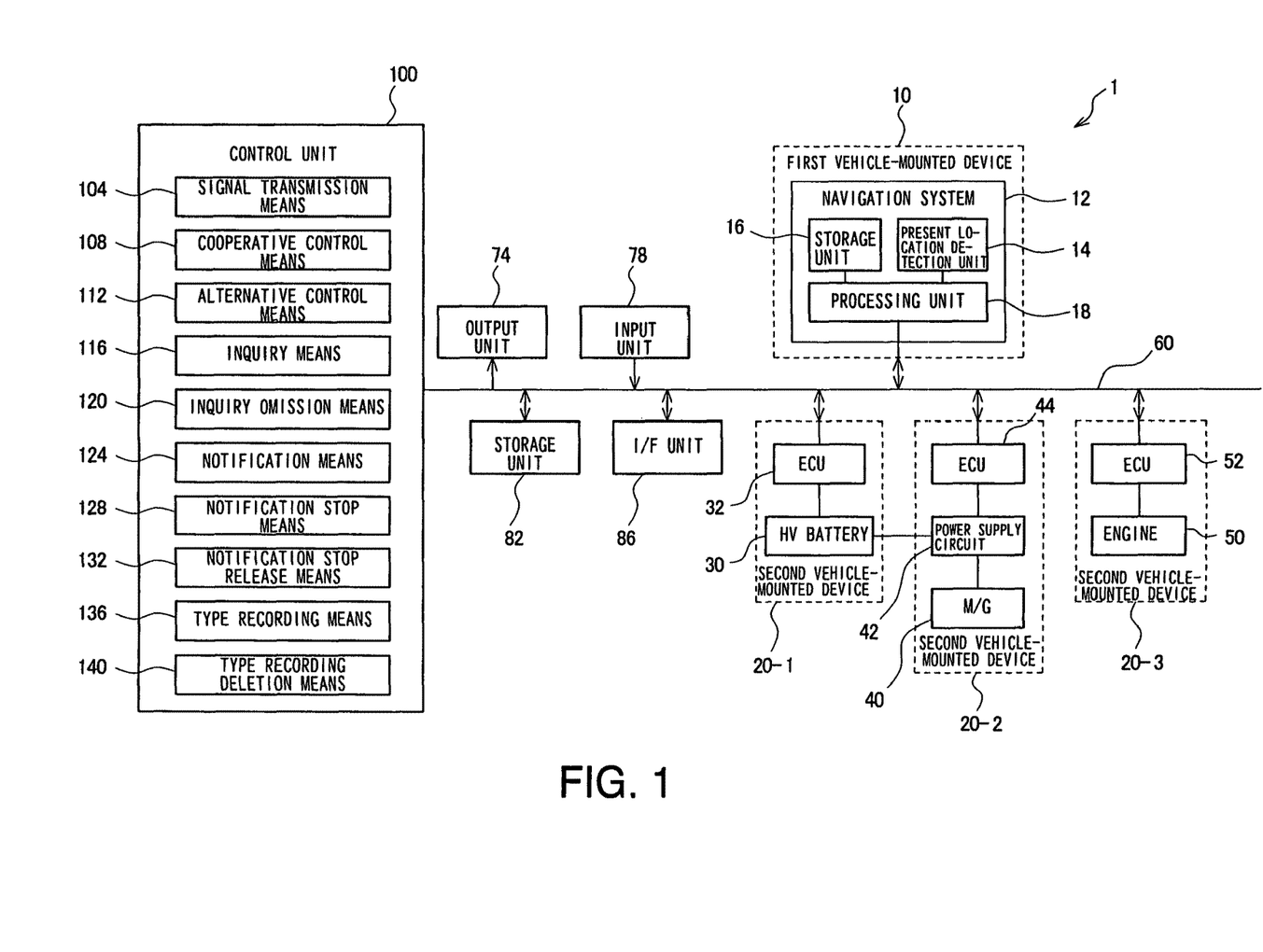
FIG. 1 is a general configuration diagram showing a vehicle-mounted device control system in an embodiment of the present invention.

FIG. 1 is a general configuration diagram showing a vehicle-mounted device control system 1 (hereinafter referred to as a control system 1) according to an embodiment of the present invention. The control system 1, which comprises a first vehicle-mounted device 10, second vehicle-mounted devices 20, and a control unit 100, carries out the cooperative control operation in which, under control of the control unit 100, the information used by the first vehicle-mounted device 10 is used for controlling the second vehicle-mounted device 20.

Although in this example three second vehicle-mounted devices 20 are employed, the present invention is not limited to configurations employing three devices. In the description below, the reference numerals 20-1, 20-2, and 20-3 are used to distinguish among the three vehicle-mounted devices 20.

For simplicity of explanation, in the following an example in which the first vehicle-mounted device 10 is a navigation system 12 is described. In this example, the second vehicle-mounted device 20-1 comprises a hybrid (HV) battery 30 and an ECU (Electric Control Unit) 32, the second vehicle-mounted device 20-2 comprises a motor generator (M/G) 40, a power supply circuit 42, and an ECU 44, and the second vehicle-mounted device 20-3 comprises an engine 50 and an ECU 52. Although the control system 1 is applied to a hybrid car in this example, it should be understood that application of the control system 1 is not limited to that described in this example.

The first vehicle-mounted device 10 and the second vehicle-mounted devices 20-1, 20-2, and 20-3 are connected, respectively, to the control unit 100. FIG. 1 shows an example of a bus topology network in which the first vehicle-mounted device 10 and the second vehicle-mounted devices 20-1, 20-2, and 20-3 are each connected to the control unit 100 via a bus line 60. It is also possible to apply another type of network, for example, a ring topology network configuration, to the control system 1.

The navigation system 12 includes a present location detection unit 14, a storage unit 16, and a processing unit 18. The present location detection unit 14, which detects the present location of the navigation system 12, that is, the present location of the vehicle on which the navigation system 12 is mounted, may be configured by the GPS (Global Positioning System). The storage unit 16, which stores navigation information (various types of information such as maps, guide routes, etc.) and programs to be executed by the processing unit 18, may be configured by one or more of devices such as a hard disk drive or a DVD (Digital Versatile Disc). The processing unit 18, connected to the present location detection unit 14 and the storage unit 16, uses the present location detected by the present location detection unit 14 and the map information stored in the storage unit 16 to search for a route from the present location to the destination or displays guide information or the like. The processing unit 18, also connected to the bus line 60, performs various types of communication processing via the bus line 60. The processing unit 18 may be configured by a computer such as a CPU (Central Processing Unit).

The HV battery 30, a high-voltage, large-capacity secondary battery, may be configured, for example, by a lithium ion battery pack or a nickel metal-hydride battery pack or the like having terminal voltage of about 200V. The ECU 32 for the HV battery is connected to the HV battery 30 and to the bus line 60 respectively. The ECU 32 for the HV battery monitors the state of the HV battery 30, for example, the state of charge (SOC), and sends the monitor result to the bus line 60.

The motor generator 40 is a rotary electric machine that functions as a motor when power is supplied, and as an electric generator when the brake is applied (at deceleration time). The power supply circuit 42, connected respectively to the motor generator 40 and the HV battery 30, supplies the power from the HV battery 30 to the motor generator 40 when the motor generator 40 functions as a motor, and receives regenerated power and charges the HV battery 30 when the motor generator 40 function as an electric generator. The ECU 44 for the motor generator, connected respectively to the power supply circuit 42 and the bus line 60, controls the power supply circuit 42 based on a command received via the bus line 60, and sends the operation information on the motor generator 40 and the power supply circuit 42 to the bus line 60.

The engine 50 generates driving force to drive the driving wheel of the car and, at the same time, drives the motor generator 40 to generate electricity. The ECU 52 for the engine, connected respectively to the engine 50 and the bus line 60, controls the throttle of the engine 50 based on a command received via the bus line 60, and sends the operation information on the engine 50 to the bus line 60.

The control system 1 further comprises an output unit 74, an input unit 78, a storage unit 82, and an interface (I/F) unit 86. The output unit 74, input unit 78, storage unit 82, and interface unit 86 are connected respectively to the bus line 60 and, via the bus line 60, to the control unit 100.

The output unit 74 and the input unit 78 function as a man-machine, or user, interface. The output unit 74 supplies various types of information from the control system 1 to the operator of the control system 1, and the input unit 78 accepts commands from the operator and supplies them to the control system 1. The output unit 74 may be configured by one or more of a display device, an indicator light, or a voice output device. The input unit 78 may be configured by one or more of operation buttons, a touch panel, or a keyboard.

The operator of the control system 1 includes many persons such as the user of the car and a dealer and the operator of a maker.

The storage unit 82, which stores various types of information and programs, may be configured by one or more of a ROM (Read Only Memory), a RAM (Random Access Memory), a rewritable non-volatile memory (for example, EPROM (Erasable Programmable ROM)), or a hard disk drive.

The interface unit 86 connects a terminal device, such as a standard personal computer, a special device, or a dedicated device, to the control unit 100. The special device or the dedicated device is, for example, a device used by a car dealer or a car maker for maintenance, inspection, and diagnosis. The interface unit 86 may be configured by one or more of various types of interface unit.

It should be noted that the vehicle-mounted devices 10, 20-1, 20-2, and 20-3, output unit 74, input unit 78, storage unit 82, and interface unit 86 may be mounted on the same car. The output unit and the input unit of a terminal device connected to the interface unit 86 may also be used as the output unit 74 and the input unit 78. It is also possible to use the storage unit of a terminal device, connected to the interface unit 86, or a storage device external to the car (for example, the storage unit of the server of a car dealer or a car maker) as a part of the storage unit 82.

The bus line 60 may be either an electrical wire or an optical fiber. In addition, instead of a wired method such as the bus line 60, a wireless method using radio waves or light may also be used as a part or whole of the network configuration of the control system 1.

The control unit 100 includes various types of means or modules. In this example, the control unit 100 comprises signal transmission means 104, cooperative control means 108, alternative control means 112, inquiry means 116, notification means 124, type recording means 136, and inquiry omission means 120.

More specifically, the signal transmission means 104 is means for transmitting a predefined signal to the first vehicle-mounted device 10. The cooperative control means 108, which is activated when the first vehicle-mounted device 10 responds to the predetermined signal described above, uses the information, used by the first vehicle-mounted-device 10, for carrying out the cooperative control operation for controlling the second vehicle-mounted device 20. The alternative control means 112, which is activated when the first vehicle-mounted device 10 does not respond to the predetermined signal described above, carries out the alternative control operation for controlling the second vehicle-mounted device 20 without using the information used by the first vehicle-mounted device 10.

The inquiry means 116, which is activated when the first vehicle-mounted device 10 does not respond to the predetermined signal described above, transmits an inquiry to the operator via the output unit 74 to query whether or not the first vehicle-mounted device 10 is a specification conforming device that satisfies the specifications defined for the cooperative control described above.

The notification means 124 acquires a response to the inquiry described above from the operator via the input unit 78 and, if the response indicates that the first vehicle-mounted device 10 is an alternative device that does not satisfy at least a part of the specifications, outputs a notification via the output unit 74 to notify that the cooperative control operation described above will not be performed.

The type recording means 136 is means for recording a type record, which indicates that the first vehicle-mounted device 10 is an alternative device, in the storage unit 82 if the first vehicle-mounted device 10 is an alternative device.

The inquiry omission means 120 is means for omitting the inquiry described above if the type record, which indicates that the first vehicle-mounted device 10 is an alternative device, is detected in the storage unit 82 before the inquiry described above is sent to the operator.

The means 104, 108, 112, 116, 120, 124, and 136 may be implemented by software. More specifically, the control unit 100 may be configured by a computer, such as a CPU, which functions as the means 104, 108, 112, 116, 120, 124, and 136. In such a case, the functions corresponding to the means 104, 108, 112, 116, 120, 124, and 136 may be implemented by executing a preinstalled program. These programs are stored in the storage unit 82, and the work area used by the control unit 100 for program execution is provided by the storage unit 82. It is also possible to implement a part or the whole of the means 104, 108, 112, 116, 120, 124, and 136 by hardware.

Figure 2:
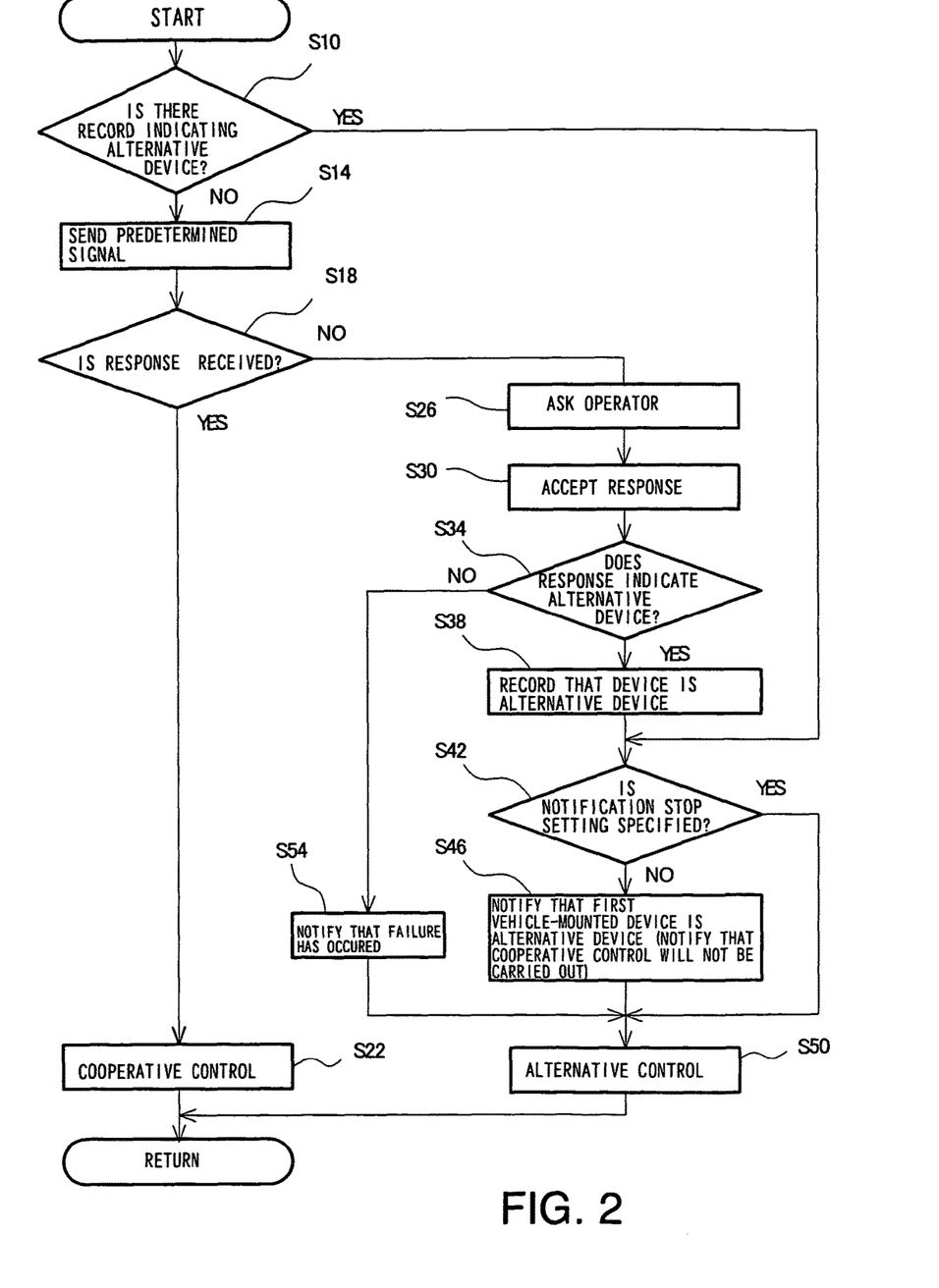
FIGS. 2 through 6 are flowcharts illustrating processing of the vehicle-mounted device control system according the embodiment of the present invention.

FIG. 2 is a flowchart showing an example of a processing procedure or processing steps of the program described above. After the power switch in the car is turned on, the program in the example in FIG. 2 is executed sequentially starting from step S10 For simplicity of explanation, step S10 will be described separately below.

The control unit 100 configured, for example, by a CPU sends the predetermined signal to the first vehicle-mounted device 10 in step S14 and, in step S18, checks if the first vehicle-mounted device 10 has responded to this signal. If it is recognized in step S18 that the first vehicle-mounted device 10 has responded to the signal, the control unit 100 executes the predetermined cooperative control operation in step S22 to control the second vehicle-mounted device 20. In contrast, if it is not recognized in step S18 that the first vehicle-mounted device 10 has responded to the signal, the control unit 100 executes step S26 and the like, which will be described later, and executes the alternative control operation, not the cooperative control operation, for the second vehicle-mounted device 20 in step S50.

An example of the cooperative control in the configuration shown in FIG. 1 is that the navigation information held by the first vehicle-mounted device 10 is used for controlling the second vehicle-mounted devices 20-1, 20-2, and 20-3. For example, the first vehicle-mounted device 10 stores information on a downward slope in the driving route of the car in the storage unit 16 and uses that information for controlling the second vehicle-mounted devices 20-1, 20-2, and 20-3 to reduce the SOC of the HV battery 30 before reaching the downward slope. This control improves the efficiency of recovery of regenerated power.

If it is known that the SOC will be reduced and if the control unit 100, which checks the capacity of the SOC of the HV battery 30 via the ECU 32 of the second vehicle-mounted device 20-1, judges that that a reduction in the SOC will not cause a problem, the control unit 100 controls the second vehicle-mounted devices 20-3 and 20-2 to switch the wheel driving via the engine 50 to the wheel driving via the motor generator 40.

As the predetermined signal transmitted in step S14, a predefined signal for querying whether or not the first vehicle-mounted device 10 is a specification conforming device may be used.

In this case, if the first vehicle-mounted device 10 is a specification conforming device, the first vehicle-mounted device 10 responds to the control unit 100. In contrast, if the first vehicle-mounted device 10 is an alternative device that does not at least partially conform to the specifications, the first vehicle-mounted device 10 does not respond to the control unit 100. Even if the first vehicle-mounted device 10 is a specification conforming device, the first vehicle-mounted device 10 does not respond if a communication error is generated between the control unit 100 and the first vehicle-mounted device 10.

That is, in steps S14 and S18, the control unit 100 judges whether or not the first vehicle-mounted device 10 is a specification conforming device that satisfies the specifications predefined for the cooperative control with the second vehicle-mounted device 20 and whether or not the first vehicle-mounted device 10 is connected to the control unit 100 correctly.

If the navigation system 12, which is an alternative device, does not have information on the downward slope, the predetermined signal described above may be a signal requesting for the information on the downward slope, that is, a signal requesting for the provision of information on the cooperative control. If such a signal is used, an appropriate response cannot be obtained from the first vehicle-mounted device 10 even if the first vehicle-mounted device 10 and the control unit 100 are connected normally. Therefore, the control unit 100 can judge if the first vehicle-mounted device 10 is a specification conforming device.

If there are several types of cooperative control to be carried out by the first vehicle-mounted device 10 and the second vehicle-mounted device 20, the information provision request signals for all types may be used in conjunction as the predetermined signals that are sent in step S14. That is, if the first vehicle-mounted device 10 responds to all multiple information provision request signals, it may be judged that the first vehicle-mounted device 10 is a specification conforming device and that the first vehicle-mounted device 10 can communicate with the control unit 100 normally. In contrast, if the first vehicle-mounted device 10 does not respond to at least a part of the multiple information provision request signals, it may be judged that the first vehicle-mounted device 10 is an alternative device or that a communication error is generated between the control unit 100 and the first vehicle-mounted device 10.

If the first vehicle-mounted device 10 does not respond in step S18 described above, the control unit 100 queries the operator of the control system 1 in the next step S26 as to whether or not the first vehicle-mounted device 10 is a specification conforming device. This query may be output via the output unit 74. The control unit 100 accepts an operator's response to the inquiry in step S30 and judges the response in step S34. If the operator's response indicates that the first vehicle-mounted device 10 is an alternative device, the control unit 100 records the type record of the first vehicle-mounted device 10 in step S38 in the storage unit 82 to indicate that the first vehicle-mounted device 10 is an alternative device.

The type record is recorded by using a predetermined flag included in the storage unit 82 or by storing a predetermined character string, which indicates that the first vehicle-mounted device 10 is an alternative device, in the storage unit 82. This record, if recorded on the hard disk drive or in the non-volatile memory such as an EPROM, may be retained even after the power switch of the car is turned off. Other information, such as the date and time of the response, may be recorded with the content of the response. The type record may also be recorded in the storage unit of a terminal device connected to the interface unit 86 or in the storage unit of the server of a car dealer.

After step S38, the control unit 100 executes steps S42, S46, and S50. First, the following describes step S46.

In step S46, the control unit 100 sends a notification which indicates that the first vehicle-mounted device 10 is an alternative device to a device external to the control system 1, for example, to the car user. This notification may be output using the output unit 74, for example, by displaying text, symbols, or graphics on the display device, by turning on a predetermined lamp, by outputting voices or a buzzer sound, or by any combination of them. Next, in step S50, the control unit 100 executes the alternate control operation to control the second vehicle-mounted device 20. Judging from the contents of steps S46 and S50, step 46 for notifying that the first vehicle-mounted device 10 is an alternative device is thought of as a step for notifying that cooperative control will not be performed.

The control system 1 is configured so that the notification described above can be stopped (this will be described later). To implement this configuration, the control unit 100 executes step S42 before step S46 to determine whether the notification stop setting is specified. If it is judged as a result of the determination in step S42 that the notification stop setting is not specified, the control unit 100 executes step S46; if it is judged that the notification stop setting is specified, the control unit 100 omits (skips) the execution of step S46 and executes step S50.

If the response accepted in step S30 indicates that the first vehicle-mounted device 10 is not an alternative device, it is considered that the first vehicle-mounted device 10 does not respond to the predetermined signal issued in step S14 because of a failure in the communication system. Therefore, if the response indicates that the first vehicle-mounted device 10 is not an alternative device, the control unit 100 executes step S54 after step S34. In step S54, the control unit 100 sends a notification via the output unit 74 to indicate that a communication failure has occurred. Subsequently, the control unit 100 carries out the alternative control operation for the second vehicle-mounted device 20 in step S50.

Step S10 will next be described. In step S10, the control unit 100 checks if a type record, which indicates that the first vehicle-mounted device 10 is an alternative device, is recorded in the storage unit 82. When the type record is specified by a predetermined flag, the control unit 100 references the status of the flag to check if the type record is recorded. When the type record is written in the storage unit 82 in the form of a predetermined character string, the control unit 100 searches the storage unit 82 for the character string using the predetermined character string as the search keyword to check if the record type is recorded. If the type record indicating that the first vehicle-mounted device 10 is an alternative device is detected as a result of the checking, the control unit 100 omits (skips) the execution of steps S14, S18, S26, S30, S34, and S38 and executes step S42. In contrast, if the type record indicating that the first vehicle-mounted device 10 is an alternative device is not detected in step S10, the control unit 100 executes step S14.

In the program shown in FIG. 2, the function of the signal transmission means 104 is implemented at by step S14, the function of the cooperative control means 108 is implemented by steps S18 and S22, and the function of the alternative control means 112 is implemented by steps S18 and S50. The function of the inquiry means 116 is implemented by steps S18 and S26, and the function of the inquiry omission means 120 is implemented by step S10. The function of the notification means 124 is implemented by steps S30, S34, and S46. The step for implementing the function of the notification means 124 may include step S42. The function of the type recording means 136 is implemented by step S38.

If the first vehicle-mounted device 10 responds to the predetermined signal, the control system 1 carries out the cooperative control using the signal transmission means 104, cooperative control means 108, and alternative control means 112; if the first vehicle-mounted device 10 does not respond to the predetermined signal, the control system 1 performs the alternative control instead of the cooperative control. For this reason, when the first vehicle-mounted device 10 is an alternative device or when a communication failure is generated between the control unit 100 and the first vehicle-mounted device 10, the cooperative control is not carried out. In this manner, this configuration ensures the proper execution of the cooperative control and prevents generation of control failures resulting from improper implementation of the cooperative control.

The inquiry means 116 is used, when the first vehicle-mounted device 10 does not respond to the predetermined signal, to determine whether the first vehicle-mounted device 10 is an alternative device or a communication failure is generated between the control unit 100 and the first vehicle-mounted device 10.

The notification means 124 keeps the car user informed that the cooperative control is not being carried out.

The inquiry omission means 120 prevents steps S26 and S30 from being executed when the program in FIG. 2 is started. This ensures that the operator is not required to respond to inquiries issued from the control system 1 and makes it possible for the user to begin driving the car more quickly.

The control unit 100 further comprises notification stop means 128 and notification stop release means 132. More specifically, the notification stop means 128 accepts a command for stopping the cooperative-control-disable notification via the input unit 78, and then stops the notification. The notification stop release means 132 accepts a command releasing the notification stop from the operator via the input unit 78, and releases the notification stop.

The notification stop means 128 and notification stop release means 132 may be implemented by software. More specifically, the control unit 100 is configured by a computer, such as a CPU, that functions as the means 128 and 132. In this case, the functions corresponding to the means 128 and 132 may be implemented by executing a predetermined program. The program is stored in the storage unit 82, and the work area used by the control unit 100 for program execution is provided by the storage unit 82. A part or the whole of the means 128 and 132 may also be implemented by hardware.

Figure 3:
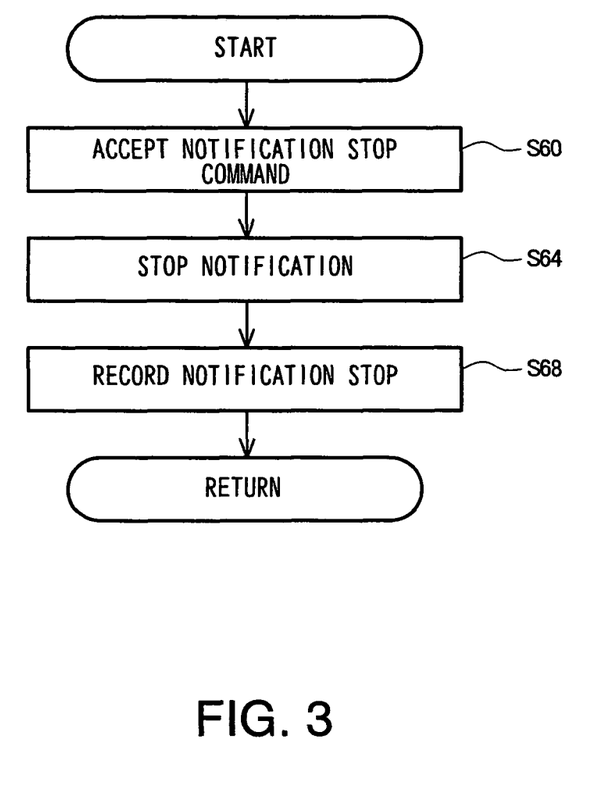
Figure 4:
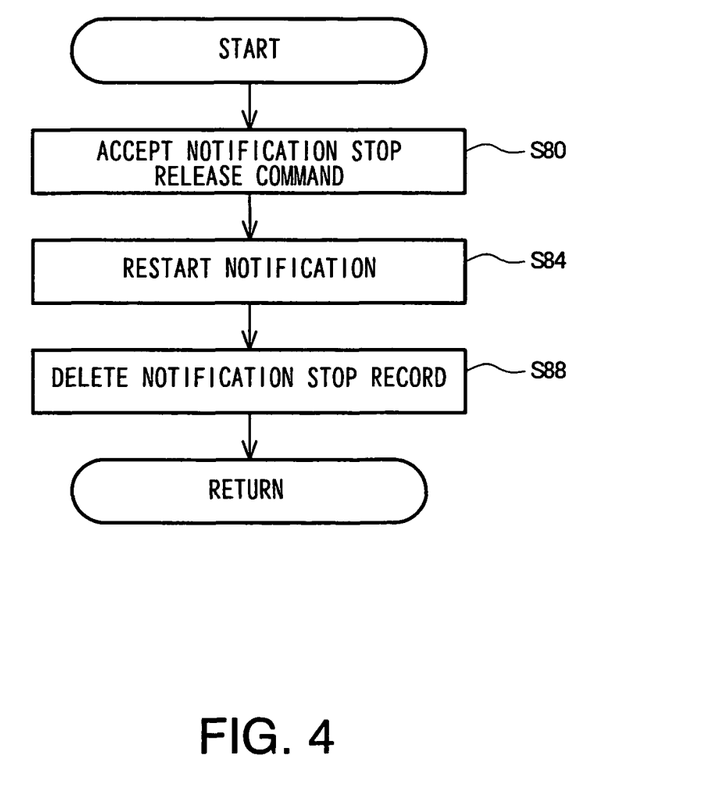

FIG. 3 and FIG. 4 are flowcharts showing an example of the processing procedure or the processing steps of the program described above. FIG. 3 shows a flowchart for setting the notification stop, and FIG. 4 shows a flowchart for releasing the notification stop.

In the program shown in FIG. 3, the control unit 100 accepts the command, which stops the cooperative-control disable notification, from the operator in step S60 via the input unit 78. After that, the control unit 100 stops the notification in step S64 and records the notification stop in the storage unit 82 in step S68. This record is used, for example, in step S42 of the program shown in FIG. 2. It should be noted that steps S64 and S68 may be executed in any order.

The notification stop record is recorded by using a predetermined flag included in the storage unit 82 or by storing a predetermined character string, which indicates the notification stop, in the storage unit 82. This record, if recorded on the hard disk drive or in the non-volatile memory such as an EPROM, may be retained even after the power switch of the car is turned off. Other information, such as the date and time of the notification stop, may be recorded with the notification stop. The notification stop record may also be recorded in the storage unit of a terminal device connected to the interface unit 86 or in the storage unit of the server of a car dealer.

The program shown in FIG. 3 is accessed in response to the operator's request entered via the input unit 78 or is included in the program shown in FIG. 2. The program shown in FIG. 3, if included in the program shown in FIG. 2, is inserted between step S46 and step S50.

In the program shown in FIG. 4, the control unit 100 accepts a command releasing the notification stop from the operator via the input unit 78 in step S80, and then restarts the notification in step S84 and deletes (resets) the record of the notification stop from the storage unit 82 in step S88. It should be noted that steps S84 and S88 may be executed in any order.

When the notification stop is recorded by using the predetermined flag, the record of the notification stop may be deleted by resetting the state of the flag. When the notification stop is recorded by storing the predetermined character string in the storage unit 82, the record of the notification stop may be deleted by deleting the character string from the storage unit 82.

The program shown in FIG. 4 is accessed in response to the operator's request entered via the input unit 78 or is included in the program shown in FIG. 2. The program shown in FIG. 4, if included in the program shown in FIG. 2, is inserted between step S42 and step S50.

In the program shown in FIG. 3, the notification stop means 128 is implemented by steps S60 and S64, and step S68 may also be included to implement the function of the notification stop means 128. In the program shown in FIG. 4, the notification stop release means 132 is implemented by steps S80 and S84, and step S88 may also be included to implement the function of the notification stop release means 132.

In a case wherein the notification is sent to the user in a displayed form, the notification stop means 128 makes the screen available for displaying other information. In a case wherein the notification is sent to the user in a voice or a buzzer sound form, the notification stop means 128 prevents an unwanted voice or buzzer sound from being generated.

On the other hand, if the notification remains stopped, there is a possibility that the vehicle may be purchased or resold without notification that the cooperative control has been disabled. In consideration of this, it is preferable that a notification stop release means 132 be provided. It should be noted that the non-volatile recording of the notification stop allows the user to check whether or not the cooperative control is enabled. It is also preferable to place limits on those who can set the notification stop. For example, adding a password requesting procedure or an authentication procedure to the program shown in FIG. 3 limits those who can set the notification stop. Alternatively, the system may also be set up to allow the notification stop to be set only via a special or dedicated terminal device employed by a car dealer. It is also preferable that the notification stop be set when a dealer is present, to ensure better notification stop management.

The control unit 100 further comprises type record deletion means 140 that deletes the type record described above. The type record deletion means 140 may be implemented by software. More specifically, the control unit 100 is configured by a computer, such as a CPU, that functions as the type record deletion means 140. With such a configuration, the function corresponding to the type record deletion means 140 may be implemented by executing a predetermined program. The program is stored in the storage unit 82, and the work area used by the control unit 100 for program execution is provided by the storage unit 82. A part or the whole of the type record deletion means 140 may also be implemented by hardware.

Figure 5:
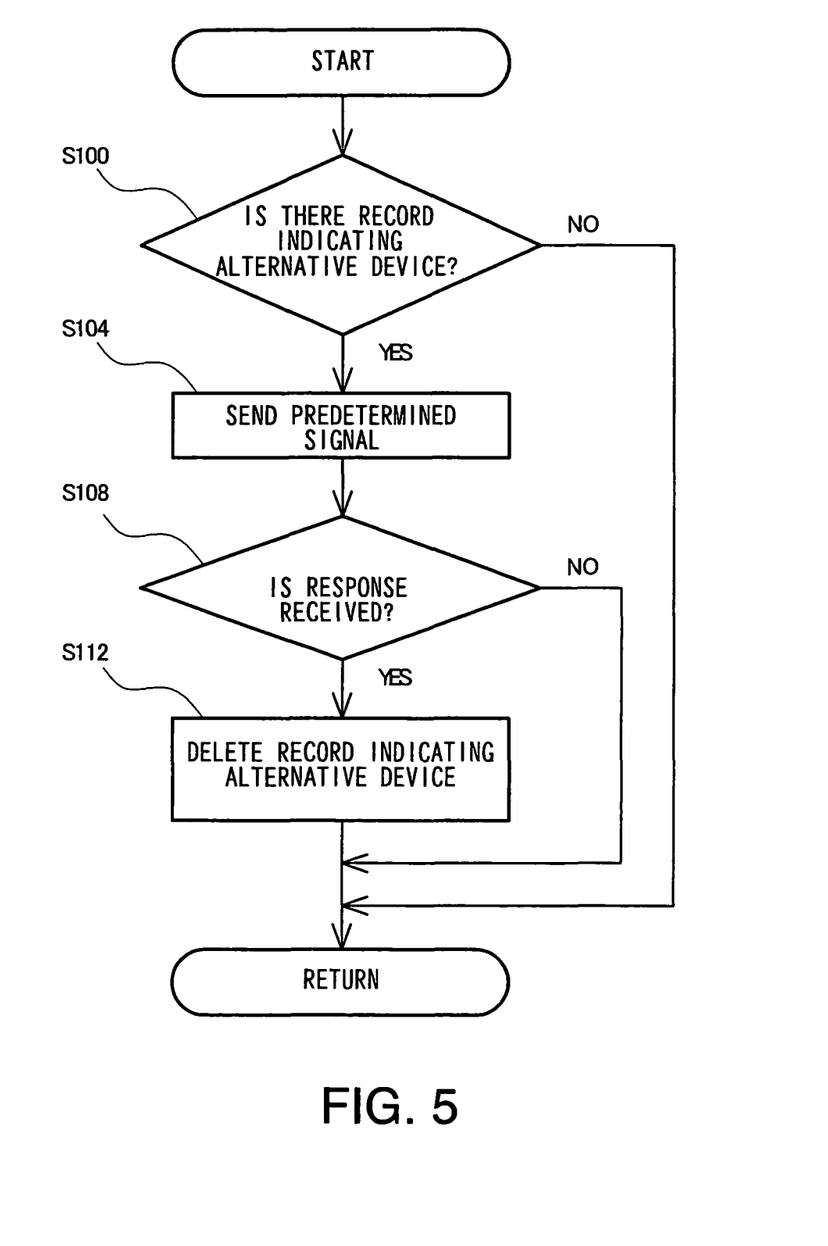

FIG. 5 is a flowchart showing an example of the processing procedure or processing steps of the program described above. In the program shown in FIG. 5, the control unit 100 determines in step S100 whether or not the type record, which indicates whether the first vehicle-mounted device 10 is an alternative device, is present. This type determination may be made in the same manner as in step S10 described above (see FIG. 2). If the result of the determination indicates that the first vehicle-mounted device 10 is an alternative device, the control unit 100 executes steps S104 and S108. In step S104, the predetermined signal is sent to the first vehicle-mounted device 10 in the same manner as in step S14 described above (see FIG. 2); in step S108, a check is made if the first vehicle-mounted device 10 responds to the predetermined signal in the same manner as in step S18 described above (see FIG. 2). If the response is received from the first vehicle-mounted device 10, the first vehicle-mounted device 10 is a specification conforming device and is connected to the control unit 100 normally. Therefore, if the response is received from the first vehicle-mounted device 10, the control unit 100 deletes (resets) the type record indicating that the first vehicle-mounted device 10 is an alternative device from the storage unit 82 in step S112.

If the type record is recorded using a predetermined flag, the state of the flag is reset to delete the record that indicates that the first vehicle-mounted device 10 is an alternative device. If the type record is recorded using a predetermined character string, the character string is deleted from the storage unit 82 to delete the type record.

On the other hand, if the type record, which indicates that the first vehicle-mounted device 10 is an alternative device, is not detected in step S100 and the first vehicle-mounted device 10 does not respond in step S108, the program in FIG. 5 is terminated.

In the program illustrated in FIG. 5, the type record is deleted automatically. Instead, as shown in the program in FIG. 6, it is also possible that the type record be deleted in response to a command from the operator.

Figure 6:
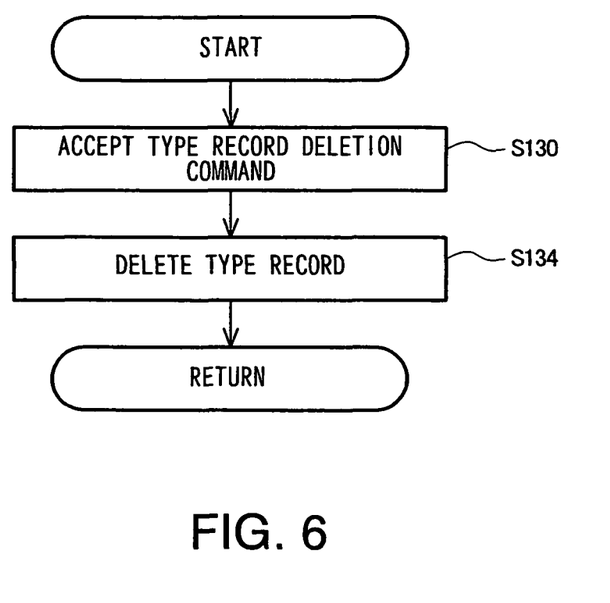

That is, in the program shown in FIG. 6, the control unit 100 accepts the type record deletion command from the operator via the input unit 78 in step S130 and deletes the type record in step S134 in the same manner as in step S112 described above.

The programs shown in FIG. 5 and FIG. 6 are accessed in response to an operator's request entered via the input unit 78 or are included in the program shown in FIG. 2. The programs, if included in the program shown in FIG. 2, may be inserted before step S10.

In the program shown in FIG. 5, the type record deletion means 140 is implemented by steps S100, S104, S108, and S112. In the program shown in FIG. 6, the type record deletion means 140 is implemented by steps S130 and S134. The type record deletion means 140 allows the cooperative control to be carried out appropriately when the first vehicle-mounted device 10 is replaced by a specification conforming device.

The means 104, 108, 112, 116, 120, 124, 128, 132, 136, and 140 may be provided in the ECU 32 for the HV battery. In this case, the ECU 32 corresponds to the control unit 100, and the second vehicle-mounted device 20-1 is configured by the HV battery 30. Similarly, a part or the whole of the means 104, 108, 112, 116, 120, 124, 128, 132, 136, and 140 may be provided in one of the ECUs 32, 44, and 52 or may be distributed among two or more of the ECUs 32, 44, and 52.

The control system 1 may also be applied to other cooperative control. For example, the cooperative control between the navigation information and the headlight device allows the headlight to be turned on before the car enters a tunnel, and automatically turned off after the car leaves the tunnel. In that example, there is one second vehicle-mounted device 20, the headlight device.

It is also possible to apply the control system 1 to the management of multiple types of cooperative control. For example, the control system 1 manages the cooperative control between the navigation information and the SOC and the cooperative control between the navigation information and the headlight device. In such case, the first vehicle-mounted device 10, although used in both cooperative controls, may be managed in either an independent or combined manner.

The invention claimed is:

1. A vehicle-mounted device control system comprising:
a navigation system;
a vehicle-mounted device,
wherein the vehicle mounted device is a device that controls an operation of at least a battery; and
a control unit connected to said navigation system and said vehicle-mounted device wherein
said control unit comprises:
a signal transmission unit,
wherein said signal transmission unit transmits a predetermined signal to said navigation system;
a cooperative control unit,
wherein said cooperative control unit performs cooperative control in which, when said navigation system responds to the predetermined signal, said vehicle-mounted device is then controlled by said control unit using information used by said navigation system; and
an alternative control unit,
wherein said alternative control unit performs alternative control in which, when said navigation system does not respond to the predetermined signal, said vehicle-mounted device is then controlled by said control unit without using information used by said navigation system,
wherein the information used by the navigation system is information relating to a downward slope of the vehicle, and when cooperative control is performed, the vehicle mounted device is controlled to reduce a state of charge of the battery based upon the information used by the navigation system.

2. The vehicle-mounted device control system according to claim 1 wherein
said control unit further comprises an inquiry unit,
wherein said inquiry unit communicates an inquiry to an operator via an output unit connected to said control unit when said navigation system does not respond to the predetermined signal, said inquiry querying whether or not said navigation system is a specification conforming device satisfying specifications predetermined for the cooperative control.

3. The vehicle-mounted device control system according to claim 2 wherein
said control unit further comprises a notification unit,
wherein said notification unit accepts a response to the inquiry from the operator via an input unit connected to said control unit and, if the response indicates that said navigation system is an alternative device at least a part of which does not satisfy the specifications, outputs a notification, which indicates that the cooperative control will not be carried out, via said output unit.

4. The vehicle-mounted device control system according to claim 3 wherein
said control unit further comprises:
type recording unit,
wherein said type recording unit records a type record in a storage unit connected to said control unit when said navigation system is an alternative device, said type record indicating that said navigation system is an alternative device; and
type record deletion unit,
wherein said type record deletion unit deletes the type record.

5. The vehicle-mounted device control system according to claim 4 wherein
said control unit further comprises an inquiry omission unit,
wherein said inquiry omission unit omits the inquiry if the type record is detected in the storage unit before the inquiry is issued, said type record indicating that said navigation system is an alternative device.

6. The vehicle-mounted device control system according to claim 3 wherein
said control unit further comprises a notification stop unit,
wherein said notification stop unit accepts a command that stops the notification from the operator via the input unit and said notification stop unit stops the notification.

7. The vehicle-mounted device control system according to claim 6 wherein
said control unit further comprises notification stop release unit
wherein said notification stop release unit accepts a command directing release of the notification stop from the operator from the input unit and said notification stop release unit releases the notification stop.

8. The vehicle-mounted device control system according to claim 2 wherein
an input unit and an output unit of a terminal device connected to said control unit are used as said input unit and said output unit.

* * * * *